United States Patent [19]
Krysinski et al.

[11] Patent Number: 5,895,012
[45] Date of Patent: Apr. 20, 1999

[54] METHOD AND DEVICE FOR REDUCING THE EFFECT OF THE VIBRATION GENERATED BY THE DRIVELINE OF A HELICOPTER

[75] Inventors: Thomasz Krysinski, Marseille; Frédéric André Henri Beroul, Aix En Provence, both of France

[73] Assignee: Eurocopter France, Marignane Cedex, France

[21] Appl. No.: 08/832,783

[22] Filed: Apr. 4, 1997

[30] Foreign Application Priority Data

Apr. 4, 1996 [FR] France ................................. 96 04234

[51] Int. Cl.[6] ........................................... B64C 27/54
[52] U.S. Cl. ................... 244/17.13; 416/500; 244/17.27
[58] Field of Search ............................ 244/76 R, 17.11, 244/17.13, 17.27, 17.25, 17.23; 416/500, 31, 36, 61

[56] References Cited

U.S. PATENT DOCUMENTS

| | | |
|---|---|---|
| 3,795,375 | 3/1974 | Lemnios . |
| 3,938,762 | 2/1976 | Murphy . |
| 3,954,229 | 5/1976 | Wilson . |
| 4,470,121 | 9/1984 | Ebert ........................................ 416/500 |
| 4,519,743 | 5/1985 | Ham ........................................ 244/17.13 |
| 4,819,182 | 4/1989 | King et al. . |
| 4,965,879 | 10/1990 | Fischer, Jr. ............................. 244/17.13 |
| 5,072,893 | 12/1991 | Charkravarty et al. ................ 244/76 R |
| 5,108,044 | 4/1992 | Weiner .................................... 244/17.19 |
| 5,195,700 | 3/1993 | Fogler, Jr. et al. .................... 244/76 R |
| 5,242,130 | 9/1993 | Mouille et al. . |
| 5,511,944 | 4/1996 | Ide et al. ................................ 244/17.13 |

FOREIGN PATENT DOCUMENTS

| | | |
|---|---|---|
| 0521759 | 1/1993 | European Pat. Off. . |
| 2736409 | 2/1979 | Germany . |
| 2149473 | 6/1985 | United Kingdom . |
| 2274634 | 8/1994 | United Kingdom . |

OTHER PUBLICATIONS

Bittanti et al. ; "Active Control of Vibrations in Helicopters: From HHC to OBC"; *Association Aeronautique et Astronautique De France*; (1992); 107.1–107.10.

J. O'Leary et al. ; *Journal of the American Helicopter Society*, vol. 27, (1982), No. 1, pp. 52–27.

Achache, Mark et al. ; *Vertica*; vol. 11, (1987), Nos. 1/2, pp. 123–138.

Primary Examiner—Galen L. Barefoot
Attorney, Agent, or Firm—Fisher, Christen & Sabol

[57] ABSTRACT

Method for reducing the effect of the vibration generated by the driveline of a helicopter. The helicopter includes at least one rotor, the collective pitch of the blades of which can be controlled by a control system. The values of at least one parameter representing the effect of the vibration generated by the driveline are measured. A control signal for the collective pitch of the blades of the rotor is directly formed from the measured values of the parameter. The control signal to the system for controlling the collective pitch of the blades of the rotor generates a set of forces and of moments which oppose the effect of the vibration generated by the driveline. The control signal thus formed is applied to the system for controlling the collective pitch of blades of the rotor.

14 Claims, 2 Drawing Sheets

METHOD AND DEVICE FOR REDUCING THE EFFECT OF THE VIBRATION GENERATED BY THE DRIVELINE OF A HELICOPTER

BACKGROUND OF THE INVENTION

1. Field of the Invention

The present invention relates to a method and to a device for reducing the effect of the vibration generated by the driveline of a helicopter, as well as to a helicopter equipped with such a device.

2. Background Art

In the known way, the driveline of a helicopter includes at least:

- a main rotor providing lift and forward travel;
- as appropriate, a counter-torque tail rotor;
- at least one engine providing the motive power needed to drive the said main and tail rotors; and
- transmission boxes and associated shafts.

It is known that under certain flight conditions the natural modes of the said driveline may become coupled with those of the fuselage, especially as the rotor speed varies and as a result of the yawing movement of the fuselage, in such a way as to generate resonance phenomena capable of causing substantial vibration of the driveline. Such vibration is capable of making the assembly thus coupled unstable or difficult to fly.

In the known way, the said coupling may especially be brought about by the controlling of the engine or by a lack of damping at the rotor, or even under the influence of the navigation system such as the automatic pilot or, as appropriate, the helicopter electrical or optical flight controls.

It is also known that the vibration which is the most troublesome as regards stabilizing the driveline and flying the helicopter is that due to the first torsional mode of the driveline, for which mode the movement of the blades of the main rotor is in phase opposition with that of the main transmission box of the driveline.

To overcome these drawbacks, a known solution recommends, naturally in addition to damping the rotor, reducing the gain in the engine control.

This solution is not, however, satisfactory, particularly for high-tonnage helicopters because during flight it is often necessary to have high gain in the engine control, especially in order to obtain good pickup.

Furthermore, it will be noted that the effect of the aforementioned troublesome vibration is generally greater when the helicopter rotors are equipped with so-called "inter-blade" drag adapters corresponding to blade dampers mounted, not between each blade and the rotor mast, but directly between two adjacent blades. This is because in this case:

- the frequency of the first torsional mode of the driveline is close to the control frequencies, for which controlling the engine gives high gain; and
- the rotor lacks damping for the movement of the blades in phase because the drag adapter acts in this case only on the differential movement of the adjacent blades.

BROAD DESCRIPTION OF THE INVENTION

The object of the present invention is to overcome these drawbacks. The invention relates to a method making it possible to reduce in a simple and effective way, the effect of the vibration generated by the driveline of a helicopter, especially for a helicopter equipped with drag adapters of the inter-blade type, the said helicopter including at least one rotor the collective pitch of the blades of which can be controlled by a control system.

To this end, the said method is noteworthy, according to the invention, in that:

- the values of at least one parameter representing the effect of the vibration generated by the said driveline are measured;
- from the measured values of the said parameter, a control signal for the collective pitch of the blades of the said rotor is formed, the said control signal being such that applying the said control signal to the system for controlling the collective pitch of the blades of the said rotor generates a set of forces and of moments which oppose the said effect of the vibration generated by the driveline; and
- the control signal thus formed is applied to the said system for controlling the collective pitch of the blades of the rotor.

Thus, by virtue of the generation of the said set of opposing forces and moments, it is possible simply and effectively to reduce the effect of the vibration generated by the driveline of the helicopter and to overcome the aforementioned drawbacks.

According to the invention, the said control signal may be applied:

- either to the main rotor providing lift and forward travel of the said helicopter,
- or, as appropriate, to the counter-torque tail rotor of the said helicopter.

It is also possible, within the context of the present invention, to envisage applying two control signals simultaneously and respectively to each of the said rotors so as to obtain resultant forces which, cumulatively, oppose the said effect to be reduced of the vibration of the driveline.

As a preference, the said parameter representing the effect of the vibration generated by the driveline corresponds to one of the following parameters:

- the speed, acceleration or the rotation of a shaft of the driveline;
- the torque exerted on a shaft of the driveline;
- a stress, an acceleration, a speed or a displacement generated on the fuselage of the helicopter;
- a parameter of the engine; or
- an environmental parameter, especially temperature and altitude.

The present invention also relates to a device for reducing the effect of vibration generated by the driveline of a helicopter, the said helicopter including at least one rotor the collective pitch of the blades of which can be controlled by a control system.

According to the invention, the said device is noteworthy in that it includes:

- at least one sensor capable of measuring the values of at least one parameter representing the effect of the vibration generated by the said driveline; and
- computation means capable:
  - of determining, from the values measured by the said sensor, a signal for controlling the collective pitch of the blades, depending on the embodiment, either of the main rotor or of the tail rotor of the helicopter, the said control signal being such that applying the said control signal to the system for controlling the collective pitch of the blades of the said rotor generates a set of forces and of moments which oppose the said effect of the vibration generated by the driveline; and
  - of transmitting the control signal thus formed to the said system for controlling the collective pitch of the blades of the rotor.

Advantageously, the sensor or sensors used to measure the values of parameters representing the effect of the vibration of the driveline may be arranged:

- on the driveline of the helicopter in order to measure, for example, one of the following parameters: the speed, the acceleration or the rotation of a shaft of the driveline or a torque exerted on a shaft of the said driveline; and/or
- on the fuselage of the helicopter, in order to measure, for example, one of the following parameters: a stress, an acceleration, a speed or a displacement generated on the said fuselage; and/or
- on the engine of the helicopter.

Furthermore, and advantageously, the said sensor may also be formed in such a way as to measure an environmental parameter, such as the altitude or the temperature for example.

BRIEF DESCRIPTION OF THE DRAWINGS

The figures of the appended drawing will make it easy to understand how the invention may be embodied. In these figures, identical references denote similar elements.

DETAILED DESCRIPTION OF THE INVENTION

Figure 1:
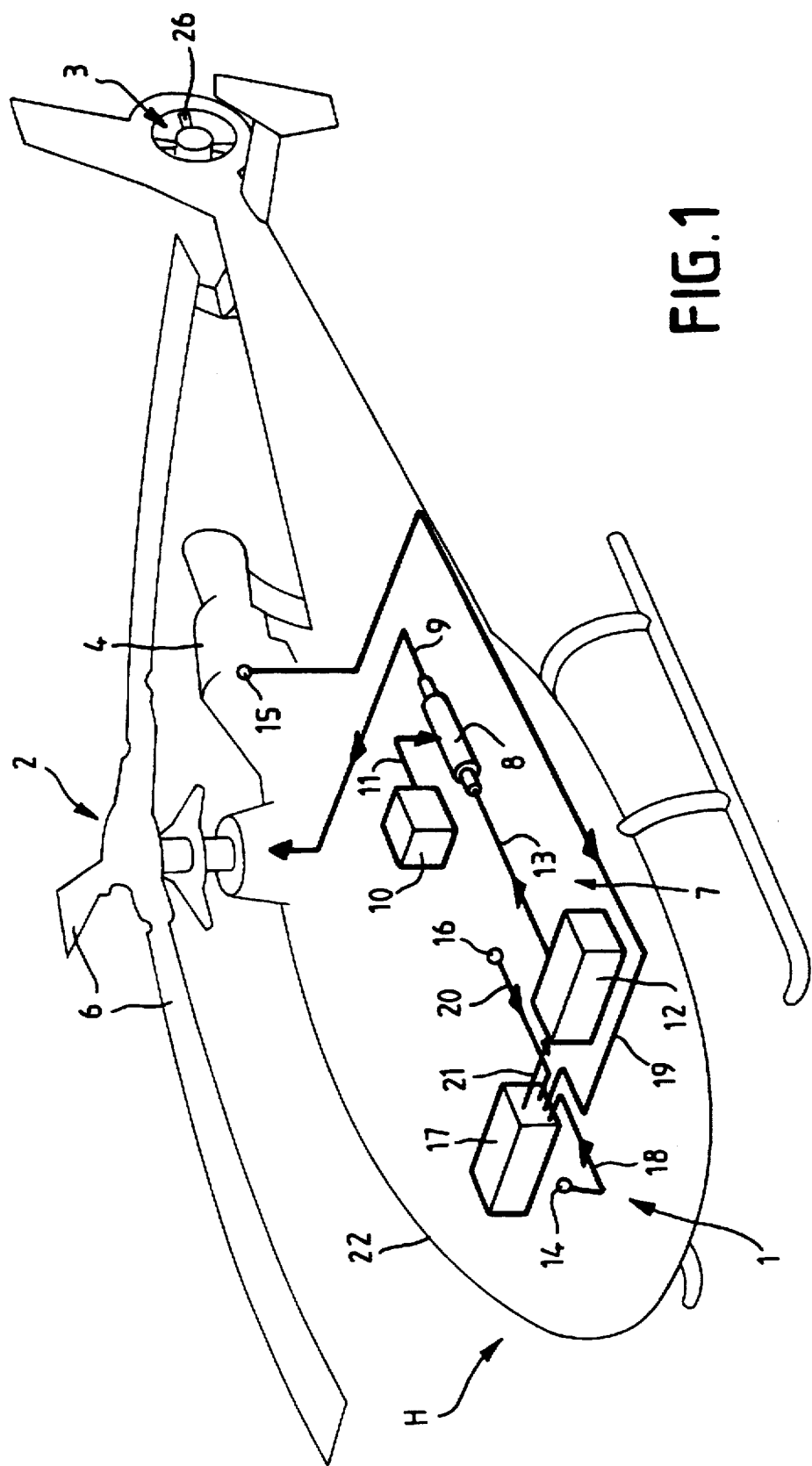
FIG. 1 diagrammatically shows a device in accordance with the invention mounted on a helicopter in a first embodiment.
Figure 2:
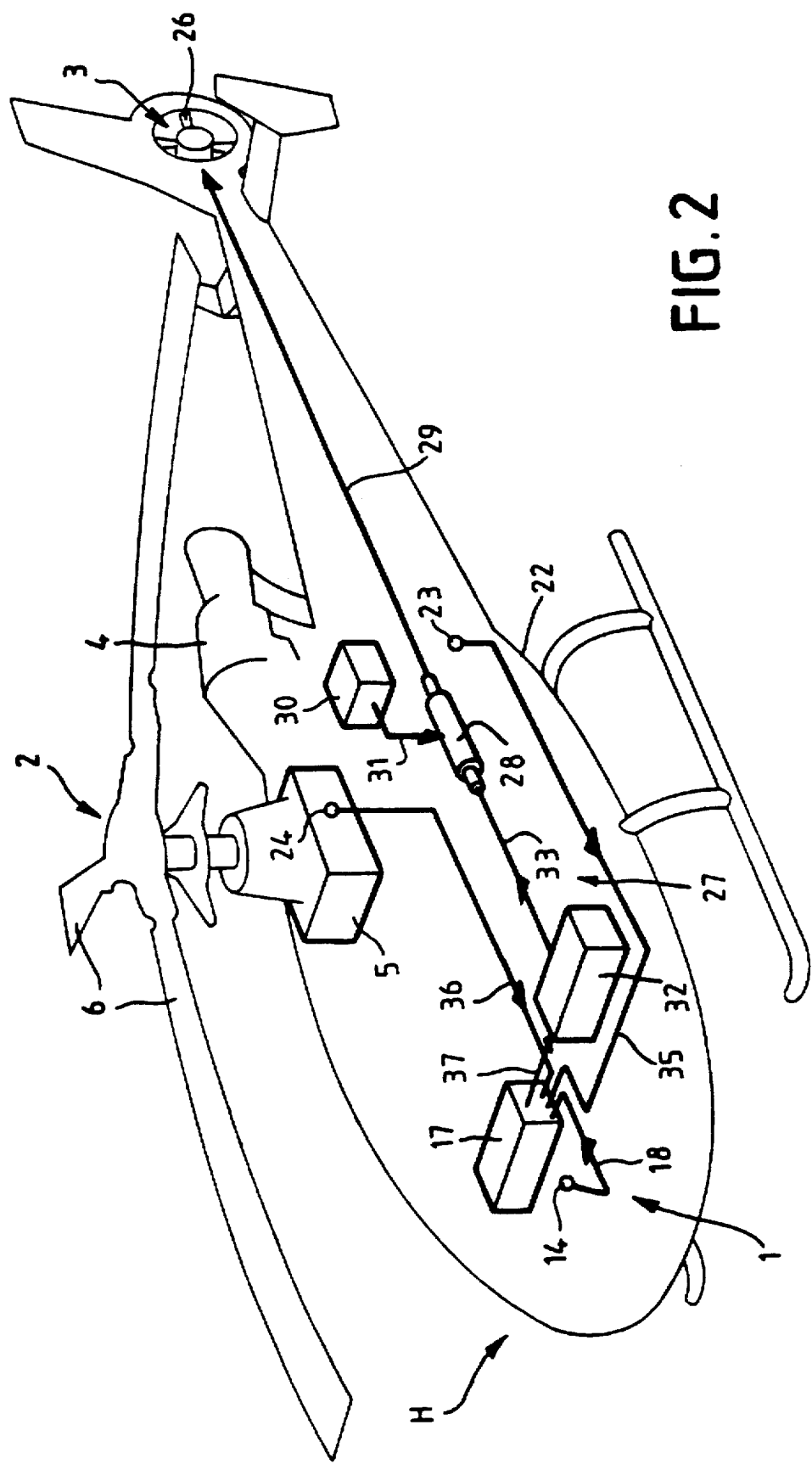
FIG. 2 diagrammatically shows a device in accordance with the invention mounted on a helicopter in a second embodiment.

The device 1 in accordance with the invention and represented diagrammatically, in two different embodiments, respectively in FIGS. 1 and 2, is intended to reduce the effect of the vibration generated by the driveline of a helicopter H.

In a known way, the said driveline includes at least the following elements of the helicopter H:

- a main rotor 2 providing lift and forward travel of the helicopter H;
- a tail rotor 3 intended to counter the torque of the said main rotor 2;
- at least one engine 4 providing the motive power used to drive the said rotors 2 and 3; and
- transmission boxes, just the main transmission box 5 of which has been represented (diagrammatically) in FIG. 2, and associated shafts which have not been represented.

As indicated earlier, the said driveline may, under certain conditions and as a result of resonance phenomena, be subjected to substantial vibration, which causes instability.

The said vibration of the driveline and its effect may especially make the helicopter H difficult to fly, under certain flight conditions.

In addition, the effect of the vibration has other drawbacks, particularly regarding:

- fatigue of components and equipments; and
- the comfort of the crew and of the passengers.

The device 1 in accordance with the invention is intended to reduce this effect of the said vibration in order to overcome the aforementioned resulting drawbacks.

Before specifying the first embodiment of the invention, represented in FIG. 1, it is recalled with reference to this FIG. 1 that the said main rotor 2 is equipped with blades 6, the collective pitch of which can be controlled by means of a control system 7 which includes especially:

- at least one actuating ram 8 or the like (connected by a link 9 represented diagrammatically to the said main rotor 2) supplied with power by a power source 10 via a link 11; and
- a control device 12 which provides the commands for the said actuating ram 8 via a link 13.

According to the invention, in order to reduce the effect of the aforementioned vibration, the said device 1 includes:

- sensors 14, 15 and 16 specified hereinbelow, capable of measuring the values of at least one parameter representing the effect of the vibration generated by the said driveline; and
- computation means 17, for example of the digital or analogue type, connected via links 18, 19 and 20 to the said sensors 14, 15 and 16 respectively and capable:
  - of determining, from the values measured by the said sensors 14, 15 and 16, a signal for controlling the collective pitch of the blades 6 of the said main rotor 2, the said control signal being such that applying the said control signal to the said control device 12 of the control system 7 (for controlling the collective pitch of the blades 6 of the main rotor 2), generates a set of forces and of moments (not represented) opposing the said effect of the vibration of the driveline; and
  - of transmitting the control signal thus formed to the said device 12 for controlling the collective pitch of the blades 6 of the main rotor 2 by means of a link 21.

Thus, by virtue of the invention, the effect of the vibration of the driveline is reduced by the opposing forces and torques generated by the device 1. The said device 1 is particularly well suited to a helicopter H the rotors of which are equipped with drag adapters, of the inter-blade type, not represented and displaying the aforementioned drawbacks.

According to the invention, the said parameter representing the effect of the vibration of the driveline may be at least one of the following parameters:

- a stress, an acceleration, a speed or a displacement generated on the fuselage 22 of the helicopter H and measured, for example, by the sensor 14 or by a sensor 23 represented in FIG. 2; and/or
- a parameter of the engine 4 measured by the sensor 15 mounted on the said engine 4; and/or
- a speed, an acceleration or a rotation of a shaft, not represented, of the driveline, or a torque exerted on such a shaft of the driveline capable, for example, of being measured by a sensor 24 represented in FIG. 2 and mounted close to the main transmission box 5, for example on a shaft, not represented, of the said driveline; and/or
- a parameter of another element of the helicopter H, such as a parameter of the automatic pilot for example or, as appropriate, of the electric flight control or optical flight control; and/or
- an environmental parameter such as the temperature or the altitude for example, it being possible for these two last-mentioned types of parameter to be measured by a known and not represented device of the helicopter H or by the sensor 16 correspondingly formed.

Apart from a desirable multiplicity of sensors, such as the sensors 14, 15 and 16 for example of the first embodiment, the architecture of the device 1 may comprise at least one duplication of some of the constituent parts in order to guarantee the safety of the helicopter H.

Of course, the application of the control signal formulated by the computation means 17 to the said control system 7 is given by way of a description but is not limiting. The present invention applies to any type of control of the collective pitch of the blades 6 of the main rotor 2. The said control signal may thus be applied, as appropriate, to the hydraulic or electric unit or to the flight control system whether this be mechanical, electrical or optical.

In the second embodiment represented in FIG. 2, the device 1 in accordance with the invention generates an action not on the main rotor 2 as in the first embodiment but on the tail rotor 3.

In a known way, the said tail rotor 3 is also equipped with blades 26, the collective pitch of which can be controlled by means of a control system 27 which includes especially:

at least one actuating ram 28 or the like (connected by a link 29 represented diagrammatically to the said tail rotor 3) supplied with power by a power source 30 via a link 31; and a control device 32 which provides the commands for the said actuating ram 28, via a link 33.

In this second embodiment, the computation means 17 connected especially by links 35 and 36 to the aforementioned sensors 23 and 24:

determine, from the values measured by the associated sensors 14, 23 and 24, a signal for controlling the collective pitch of the blades 26 of the said tail rotor 3, the said control signal being such that applying the said control signal to the device 32 for controlling the collective pitch of the blades 26 of the said tail rotor 3 generates a set of forces and of moments which oppose the said effect of the vibration of the driveline; and the control signal thus formed is applied to the said device 32 for controlling the collective pitch of the blades 26 of the tail rotor 3 by a link 37.

Of course in the context of the present invention, it is possible to envisage a combined action both on the collective pitch of the blades 6 of the main rotor 2 and on the collective pitch of the blades 26 of the tail rotor 3. In this case, the respective controls of the said collective pitches have to be matched to one another in order to obtain cumulative opposing forces matched in amplitude and in phase to the vibration the effect of which is to be reduced.

It will be noted that the present invention may advantageously be applied to any type of rotor, and this is true irrespective of the type of damper mounted on these rotors.

In addition, the device 1 in accordance with the invention may either be produced in the form of an autonomous device or be incorporated into the helicopter control system, if appropriate, for example, into the automatic pilot or into the electrical or optical navigational controls.

We claim:

1. A method for reducing the effect of the vibration generated by the driveline (2, 3, 4, 5) of a helicopter (H), the said helicopter (H) including at least one rotor (2, 3), the collective pitch of the blades (6, 26) of which can be controlled by a control system (7, 27), comprising:

(i) measuring the values of at least one parameter representing the effect of the vibration generated by the said driveline (2, 3, 4, 5);

(ii) forming a control signal for the collective pitch of the blades (6, 26) of the said rotor (2, 3) directly from the measured values of the said parameter, the said control being such that applying the said control signal to the system for controlling the collective pitch of the blades (6, 26) of the said rotor (2, 3) generates a set of forces and of moments which oppose the said effect of the vibration generated by the driveline (2, 3, 4, 5); and (iii) applying the control signal thus formed to the said system (7, 27) for controlling solely the collective pitch of the blades (6, 26) of the rotor (2, 3).

2. The method according to claim 1, wherein the said rotor the collective pitch of the blades (6) of which is being controlled is the main rotor (2) providing lift and forward travel of the said helicopter (H).

3. The method according to claim 2 for a helicopter (H) including a counter-torque tail rotor (3), wherein the said rotor the collective pitch of the blades (26) of which is being controlled is the tail rotor (3) of the said helicopter (H).

4. The method according to claim 2, wherein the said parameter representing the effect of the vibration generated by the driveline (2, 3, 4, 5) corresponds to one of the following parameters:

(a) the speed, acceleration or the rotation of a shaft of the driveline (2, 3, 4, 5);

(b) the torque exerted on a shaft of the driveline (2, 3, 4, 5);

(c) a stress, an acceleration, a speed or a displacement generated on the fuselage (22) of the helicopter (H);

(d) a parameter of the engine (4) of the helicopter (H); or (e) an environmental parameter, especially temperature and altitude.

5. A device for reducing the effect of vibration generated by the driveline (2, 3, 4, 5) of a helicopter (H), the said helicopter (H) including at least one rotor (2, 3), the collective pitch of the blades (6, 26) of which can be controlled by a control system (7, 27), comprising:

(a) at least one sensor (14, 15, 16, 23, 24) capable of measuring the values of at least one parameter representing the effect of the vibration generated by the said driveline (2, 3, 4, 5); and (b) computation means (17) capable:

(i) of determining, directly from the values measured by the said sensor (14, 15, 16, 23, 24), a signal for controlling the collective pitch of the blades (6, 26) of the said rotor (2, 3), the said control being such that applying the said control signal to the system (7, 27) for controlling the collective pitch of the blades (6, 26) of the said rotor (2, 3) generates a set of forces and of moments which oppose the said effect of the vibration generated by the driveline (2, 3, 4, 5); and (ii) of transmitting the control signal thus formed to the said system (7, 27) for controlling solely the collective pitch of the blades (6, 26) of the rotor (2, 3).

6. The device according to claim 5, wherein the said rotor the collective pitch of the blades (6) of which is being controlled is the main rotor (2) providing the forward travel and lift of the said helicopter (H).

7. The device according to claim 5 for helicopter (H) including a counter-torque tail rotor (3), wherein the said rotor the collective pitch of the blades (26) of which is being controlled is the tail rotor (3) of the said helicopter (H).

8. The device according to claim 5, wherein the said sensor (24) is arranged on the driveline (5) of helicopter (H).

9. The device according to claim 5, wherein the said sensor (24) measures at least one of the following parameters: the speed, the acceleration or the rotation of a shaft of the driveline, or a torque exerted on a shaft of the driveline.

10. The device according to claim 5, wherein the said sensor (14, 23) is arranged on the fuselage (22) of the helicopter (H).

11. The device according to claim 6, wherein the said sensor (14, 23) measures at least one of the following parameters: a stress, an acceleration, a speed or a displacement generated on the said fuselage (22).

12. The device according to claim 5, wherein the said sensor (15) is mounted on the engine (4) of the helicopter (H).

13. The device according to claim 5, wherein the said sensor (16) is formed in such a way as to measure an environmental parameter.

14. A helicopter which includes the device (1) specified in claim 5 for reducing the effect of the vibration generated by the driveline (2, 3, 4, 5) of said helicopter (H).

* * * * *